United States Patent
Thomas

(10) Patent No.: US 6,375,892 B2
(45) Date of Patent: *Apr. 23, 2002

(54) METHOD FOR GAS ASSIST INJECTION MOLDING

(75) Inventor: Ronald W. Thomas, Harrison Twp., MI (US)

(73) Assignee: Alliance Systems, Inc., Chesterfield Twp., MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,994

(22) Filed: Aug. 27, 1998

Related U.S. Application Data

(60) Provisional application No. 60/057,087, filed on Aug. 27, 1997.

(51) Int. Cl.[7] .............................................. B29D 22/00
(52) U.S. Cl. ....................................................... 264/572
(58) Field of Search ......................................... 264/572

(56) References Cited

U.S. PATENT DOCUMENTS

| | | |
|---|---|---|
| 4,740,150 A | 4/1988 | Sayer |
| 4,781,554 A | 11/1988 | Hendry |
| 4,824,731 A | 4/1989 | Matsuyama et al. |
| 4,855,094 A | 8/1989 | Hendry |
| 4,935,191 A * | 6/1990 | Baxi ........................... 264/572 |
| 4,943,407 A | 7/1990 | Hendry |
| 5,032,345 A * | 7/1991 | Hendry ....................... 264/572 |
| 5,047,183 A | 9/1991 | Eckardt et al. |
| 5,118,455 A | 6/1992 | Loren |
| 5,131,226 A | 7/1992 | Hendry |
| 5,141,682 A | 8/1992 | Steinbichler et al. |
| 5,200,127 A * | 4/1993 | Nelson ........................ 264/572 |
| 5,295,800 A * | 3/1994 | Nelson et al. ............... 264/572 |
| 5,637,328 A * | 6/1997 | Shah et al. .................. 425/130 |
| 5,728,325 A * | 3/1998 | Blankenburg ................ 264/28 |
| 5,799,385 A * | 9/1998 | Vecchiarino et al. ........ 29/469 |
| 5,939,103 A * | 8/1999 | Erikson ....................... 264/572 |

FOREIGN PATENT DOCUMENTS

| | | | |
|---|---|---|---|
| JP | 91-061373 | * | 1/1991 |

* cited by examiner

Primary Examiner—Suzanne E. McDowell
(74) Attorney, Agent, or Firm—Dinnin & Dunn, P.C.

(57) ABSTRACT

A method of providing gas assistance to a plastic injection molding process including an initial burst of gas at the supply pressure.

6 Claims, 1 Drawing Sheet

METHOD FOR GAS ASSIST INJECTION MOLDING

Continuation of Provisional Application Ser. No. 60/057,087-filed: Aug. 27, 1997.

BACKGROUND OF THE INVENTION

The present invention relates to the gas assisted injection molding of plastic parts. In particular the present invention involves an improvement in the control of air during the injection process.

Gas assisted injection molding is well known in the art. Generally, hot plastic resin is injected into a mold and gas is injected into the mold to "push" the molten resin to completely and uniformly cover the surface of the mold. The gas is then vented, the mold opened and the part removed.

The success of the "gas assist" process can depend greatly upon the injection pressure of the gas. Baxi, U.S. Pat. No. 4,935,191 describes injecting gas at a pressure at least equal to the pressure of the plastic, without controlling the flow of gas. Conversely Hendry U.S. Pat. Nos. 4,855,094 and 4,943,407 provide a gas charge lower than the plastic injection pressure. Others, such as in Loren U.S. Pat. Nos. 5,118,455 and 5,039,463 have endeavored to plot detailed gas pressure profiles to describe preferred processes for controlling the gas injection pressure always providing a source pressure higher than the initial injection pressure. A further example is U.S. Pat. No. 5,141,682 to Steinbichler which provides dual gas supply and dual hydraulic reservoirs. The focus of these efforts have been to provide a surplus volume of gas so that the desired pressure profile can be run and the reservoir pressure will never drop below the pressure desired. Each of these efforts fail to take full advantage of the full storage pressure, as they regulate the pressure down prior to injection. While it is known to increase pressure during the "hold" cycle in which the plastic cures against the mold surface, no one appears to have recognized the advantage of a high pressure burst to begin the gas injection. The convoluted efforts to control gas pressure (including controlling volume) were partially inspired by failures when gas was injected at too high a pressure, which would pierce through the molten resin much like a child over blowing a chewing gum bubble, and creating pressure within the mold which would resist the injection of molten plastic.

These and other advantages of the present invention will be readily apparent from the drawings, discussions and description, which follow.

SUMMARY OF THE INVENTION

While preferred gas injection profiles and injection control can vary from application to application, it has been determined that a brief burst of gas injected at the beginning of the gas injection cycle facilitates the gas injection process and generally improves the molding process. While molten resin is fluid, it is viscous to the point of requiring the gas pressure to flow to completely cover the mold surface. In the past failures, the high pressure injection was not regulated in time, and thus the gas pressure would shear the molten material. Where others regulated the initial injection pressure downward, the present invention regulates the time of the initial injection.

The initial burst of gas, at whatever pressure is available, rapidly displaces the charge of molten resin injected prior to the gas injection, providing an impulse which overcomes the friction the molten plastic incurs in the inlet. Although the effects upon the physical properties of the plastic resulting from the burst cannot be fully explained, when the pressure is reduced to a typical injection pressure, the plastic more easily flows and completely covers the mold than if the initial burst was not provided. Further, the initial gas burst allows the plastic to be injected at a more rapid rate, thus allowing the plastic to travel farther while hot, when it is in a more fluid state. Thus, the remaining fill out portion of the gas injection cycle may be conducted at a relatively lower pressure.

Critical to the process is the control of the initial burst in time, so that the material does not shear and the "blowout" condition occurs. Once the initial burst is complete, the remainder of the gas injection cycle (fill out, hold, vent) is conducted to optimize the molding process for the given application (part size and thickness, material used).

Accordingly, the object of the present invention is to utilize the stored pressure in a gas assisted injection molding operation to provide an initial burst of gas at the stored pressure at the beginning of the gas injection stage.

BRIEF DESCRIPTION OF THE DRAWINGS

An embodiment of the invention is explained below with reference to the drawing wherein the only figure is a diagram of a gas supply apparatus for an injection molding machine according to the present invention.

DESCRIPTION OF THE PREFERRED EMBODIMENT

Figure 1:
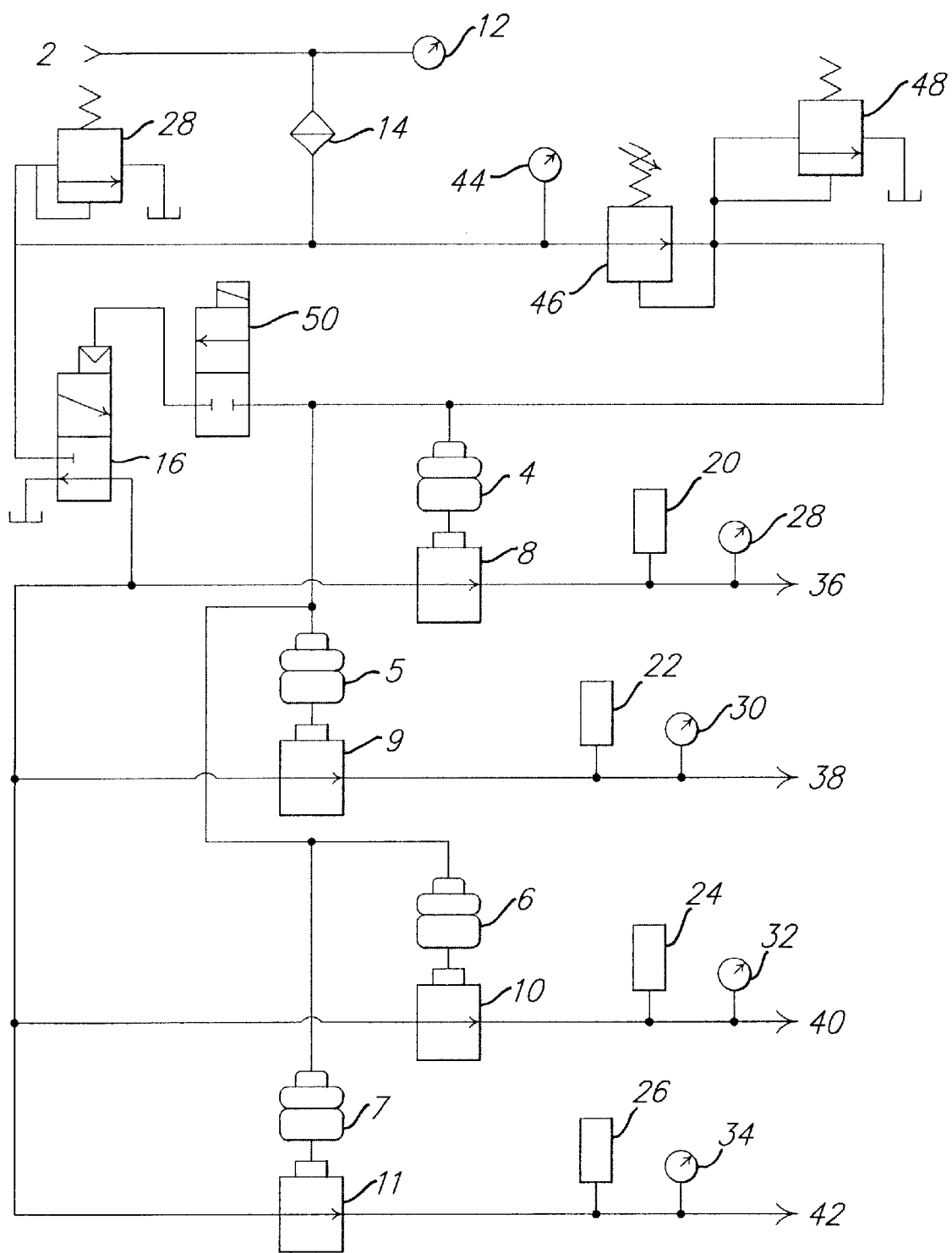

In the drawing, an apparatus for injecting gas into a mold of an injection molding machine for the production of plastic articles is shown only schematically. The invention comprises a method for injecting gas into the mold and utilizes components known in the industry. The pneumatic diagram of the flow of the gas is shown in FIG. 1.

The source gas, preferably $N_2$, is received from a gas source or stored gas supply means 2. Inlet pressure is monitored at gage 12 and the gas is passed through a filter 14. Supply of the gas to the injection points is controlled by valve 16, which may be protected by a fixed relief valve 48, which will open the line to atmosphere if there is a malfunction in the gas supply and the pressure exceeds a selected pressure i.e. 10,000 psi. The valve 16 feeds the gas injection system, which can contain a single or multiple injection points. For the sake of illustration, four injection points are shown in FIG. 1. Valve 16 leaves the injection system open to the atmosphere until engaged, at which point the gas at the source pressure is directed to mechanical slave regulators 8, 9, 10 and 11. The mechanical slave regulators are controlled by electronic regulators 4, 5, 6 and 7. The gas released by the regulators 8, 9, 10 and 11 through transducers 20, 22, 24 and 26, which generate an electronic signal transmitted back to the electronic regulators 4, 5, 6, and 7 to verify proper gas flow has occurred.

Process gage regulators 28, 30, 32 and 34 provide visual verification of the gas pressure at injection through inlets in the mold indicated at 36, 38, 40, and 42.

A pilot circuit flows past pressure gage 44 and through a pressure reducing valve 46, which reduces the source pressure to a fixed pressure suitable for driving the pneumatic valves, preferable about 125 psi. The pilot circuit is guarded by a fixed relief valve 48, which will open the line to the atmosphere if the pressure exceeds a given value, for example 150 psi. Solenoid valve 50 must be electronically activated to expose the valve 16 to the pressure in the pilot line to connect the injection system to the gas source. If the solenoid 50 is deactivated, valve 16 is closed and the injection system opened to the atmosphere. Emergency stop buttons can be connected to the solenoid valve 50 for immediate shut-off of the gas supply to the injection system.

The electronic regulators 4 are CNC (computer numeric controller) controlled. Thus, for any given operation the gas injection profile can be programmed to run automatically. With the apparatus diagramed in FIG. 1, the gas injection pressure can be instantaneously raised or lowered, or gradually raised or lowered which would give a ramping effect or a sloped gas injection profile. The gas injection pressure can be varied in virtually unlimited number of permutations between 0 (ambient) pressure and the source pressure, and can yield even curved gas injection profiles if desired. The only limitation is the response time of the mechanical regulators.

The critical aspect of the invention is the regulation of the initial burst of gas at the source pressure. The duration of the initial burst will vary dependent upon the source pressure, the type of material use, the amount of material used, the temperature of the material and the size of the mold cavity. In typical operations utilizing a source pressure of 3,000 psi to 8,000 psi, the initial burst of gas (typically nitrogen) is less than one second. It is preferred that the initial burst occur at a source pressure of 3,000 to 6,000 psi and last for ½ second or less. The pressure is then lowered for the remainder of the fill cycle when the plastic is distributed throughout the mold, which is typically 2 to 3 seconds, but may take as much as 5 seconds. The pressure may then be increased if desired during the hold cycle, in which the gas pressure holds the plastic in place against the mold surface while the plastic cools, which typically lasts 30 to 60 seconds. The gas is then vented and the molded article removed. In certain industrial applications, plants may utilize an accumulator between the gas source and the regulator to provide a sufficient pressure to achieve the desired results, or to maintain the source gas pressure between the desired 2,00–6,000 psi.

In view of the foregoing, it is to be understood that the drawings, discussion and description herein are merely meant to represent particular embodiments of the invention and are not meant to be a limitation upon the practice thereof. It is the following claims, including all equivalents, which define the scope of the invention.

What is claimed is:

1. A method of supplying gas from a gas source into a molten plastic injection molding apparatus comprising the steps of:
   injecting the gas into said molding apparatus for a first interval into a moving supply of plastic material at a point before said material enters an inlet of said apparatus without substantially diminishing the pressure of said gas from said gas source;
   injecting the gas into said molding apparatus at a second pressure lower than the pressure of said gas in said gas source for a second period substantially longer than said first interval.

2. The method of claim 1 wherein said interval is less than one second.

3. The method of claim 1 wherein said interval is ½ second or less.

4. The method of claim 1 wherein said gas source is maintained approximately between 3,000 psi and 6,000 psi.

5. A method of supplying gas from a gas source into a molten plastic injection molding apparatus comprising the steps of:
   injecting the gas into said molding apparatus for a first interval during the injection of said plastic material without substantially diminishing the pressure of said gas from said gas source;
   injecting the gas into said molding apparatus at a second pressure lower than the pressure of said gas in said gas source for a second period substantially longer than said first interval.

6. A method of supplying gas from a gas source into a molten plastic injection apparatus having an inlet, said method comprising the steps of:
   injecting molten plastic material through said inlet;
   injecting said gas through said inlet for a first interval during the injection of said plastic material without substantially diminishing the pressure of said gas from said gas source;
   injecting gas into said molding apparatus at a second pressure lower than the pressure of said gas in said gas source for a second period substantially longer than said first interval.

\* \* \* \* \*